Aug. 19, 1924.

J. F. McCAUSLAND 1,505,269

KNOCKDOWN RIM FOR TIRES

Filed July 17, 1923   2 Sheets-Sheet 1

Witnesses:

Inventor
J. F. McCausland

Aug. 19, 1924.

J. F. McCAUSLAND

KNOCKDOWN RIM FOR TIRES

Filed July 17, 1923

Witnesses:
P. M. Hunt

Inventor
J. F. McCausland
By Clarence O'Brien
Attorney

Patented Aug. 19, 1924.

1,505,269

UNITED STATES PATENT OFFICE.

JAMES F. McCAUSLAND, OF PRINCETON, NEW JERSEY.

KNOCKDOWN RIM FOR TIRES.

Application filed July 17, 1923. Serial No. 652,033.

*To all whom it may concern:*

Be it known that I, JAMES F. MCCAUS-LAND, a citizen of the United States, residing at Princeton, in the county of Mercer and State of New Jersey, have invented certain new and useful Improvements in Knockdown Rims for Tires, of which the following is a specification.

In carrying out the present invention it is my purpose to provide a highly improved rim for tires wherein the tires may be applied thereto or removed therefrom in a novel simple and expeditious manner without the use of any costly tire removing or replacing tools which will be resultant in the saving of both time and labor.

The primary object of this invention is the provision of such a tire rim that is extremely simple of construction and one that may be manufactured and marketed at a cost no greater than the cost of the rims now universally used.

The invention comprises essentially a pair of half-sections to be detachably secured together by an extremely simple form of clamp the nature of this clamp being such that when the pair of half sections are secured together the liability of the rim coming apart is practically impossible.

With the above and other objects in view as the nature of the invention is better understood from the following specification and the accompanying drawings the same consists in the novel combination and arrangement of parts hereinafter more fully described shown in the accompanying drawings and claimed.

In the drawings wherein like reference characters indicate corresponding parts through out the several views, and wherein.

Figure 1:
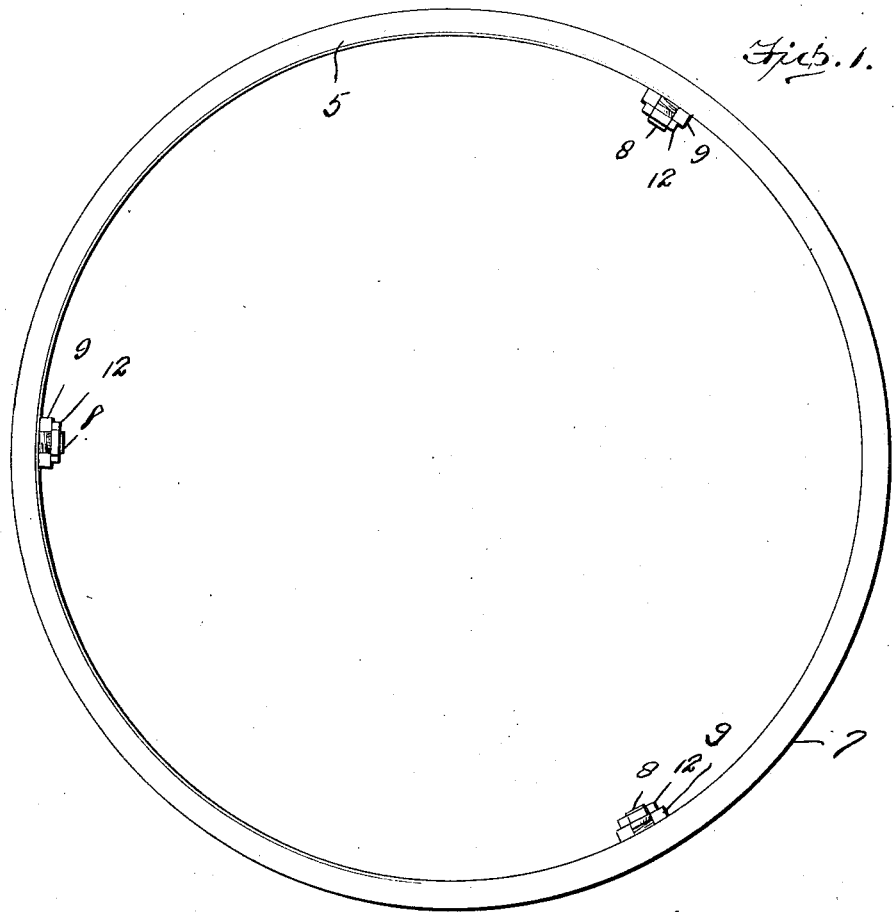
Figure 1 is an elevation of one side of my improved rim.
Figure 6:
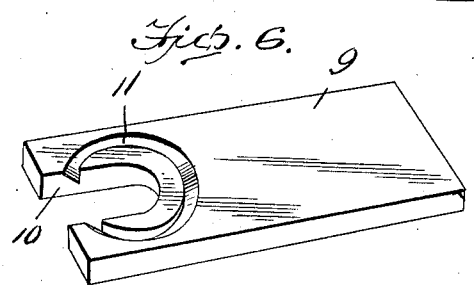
Figure 5:
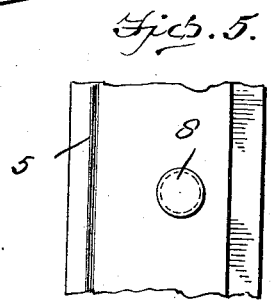
Figure 2:
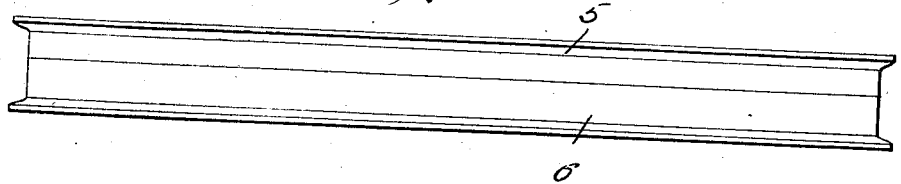
Figure 2 is a top plan view thereof.
Figure 4:
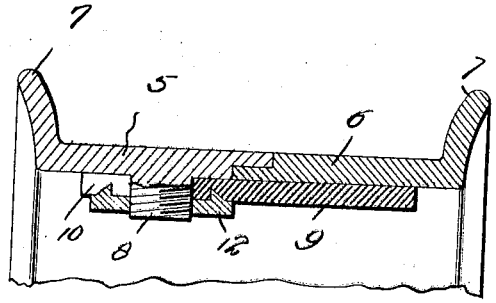
Figure 7:
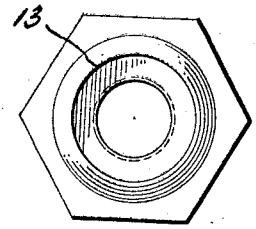

Figure 4 is a detailed transverse cross section of the rim showing more clearly the form of clamping means between the pair of half-sections, Figure 5 is a fragmentary elevational view of the underside of one of the sections of the rim which section includes showing one of the screw threaded boss members that forms an essential part of the clamping means between the half sections of the rim, Figure 6 is a perspective view of a plate element that is carried by the other of said rim sections, it being understood in this connection that any desirable number of these plates may be employed, it only being necessary to form the complementary half-section with a similar number of screw threaded bosses, and Figure 7 is a bottom plan view of a particular form of nut that is employed in conjunction with this invention.

Now having particular reference to the drawings, my novel rim embodies a pair of half-sections designated 5 and 6 respectively, the inner edges of these rim sections being so formed as to have overlapping relation with each other when positioned together. A particular form of joint is shown in the figures, it being nevertheless understood that I do not wish to limit myself to such a joint as shown, as in the future practice of the invention departures may be had therefrom without affecting the spirit and scope of the appended claims.

Figure 3:
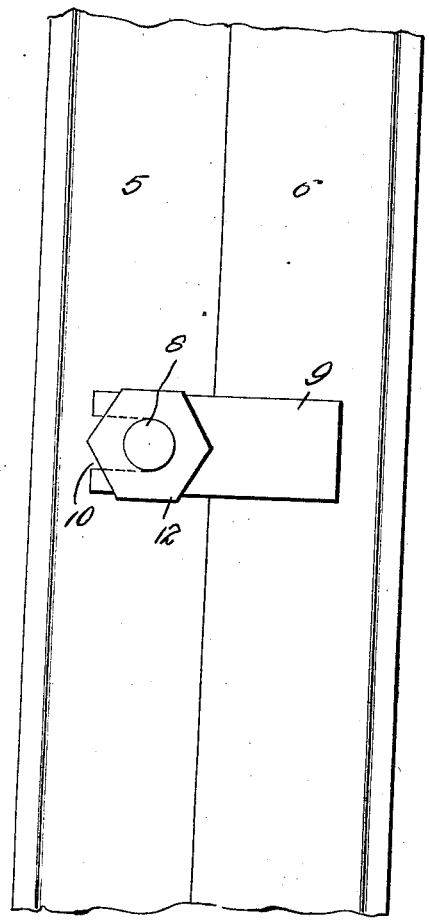
Figure 3 is an enlarged fragmentary elevation of the underside of the rim.

The outer edges of said half sections 5 and 6 are formed with the usual upstanding and slightly outwardly curved flanges 7 for obvious purposes and formed upon the inner side of the section 5 and at spaced points thereon is a desirable number of pendant and screw threaded bosses 8. Welded or otherwise suitably secured to the inner side of the complementary half section 6 are flat-like plates 9 the outer ends of which extend beyond the inner edge of said rim section and are bifurcated at 10. The number of those plates 9 correspond to the number of the bosses 6 it being understood that when the half sections 5 and 6 are positioned as in Figure 4 the bosses 8 will extend between the legs afforded by the bifurcated ends of said plates 9 as shown more clearly in Figures 3 and 4.

The inner side of the projecting portion of each of these plates 9 is channeled at 11, the outer wall of this channel being beveled as more clearly shown in Figure 6. After the rim sections have been engaged with each other in a manner shown in Figure 4 nuts 12 are screwed upon said screw threaded bosses 8, the inner surfaces of these nuts being provided with a circumferential tongue 13 the outer edge of which is beveled, these tongues adapted for interfitting the channels 11 in the plates 9 for preventing disengagement of the plates from the bosses 8.

From the foregoing description when considered in conjunction with the accompanying drawings numerous advantages of a rim of this character will be at once apparent to those skilled in the art and even though I have herein set forth the most practical embodiment of the invention with which I am at the present time familiar, it is nevertheless understood that minor changes may be made in the invention without departing from the spirit and scope as claimed.

Having thus described my invention what I claim as new and desire to secure by Letters Patent is:—

1. A rim for tires of the class described a pair of half-sections adapted to be positioned together, screw threaded bosses formed upon the inner side of one of said half sections, inwardly extending plate members formed upon the inner side of the other of half-sections, said plates extending beyond the inner edge of said half section and bifurcated for engagement over said bosses of the other of said half-sections, and nuts adapted to be screwed on to said bosses.

2. A rim for tires of the class described a pair of half-sections adapted to be positioned together, screw threaded bosses formed upon the inner side of one of said half-sections, inwardly extending plate members formed upon the inner side of the other of said half-sections, said plates extending beyond the inner edge of said half-section and bifurcated for engagement over said bosses of the other of said half-sections, and nuts adapted to be screwed on to said bosses, said plates being formed with grooves surrounding the bosses for the reception of tongues formed upon the inner sides of said nuts whereby the tongues on the nuts cooperate with the grooves in the plates for positively preventing lateral movement of the plates relative to the nuts in assembled relation.

In testimony whereof I affix my signature.

JAMES F. McCAUSLAND.